United States Patent
Aposhian et al.

(10) Patent No.: US 11,071,250 B2
(45) Date of Patent: Jul. 27, 2021

(54) MOWER DECK ROLLER ASSEMBLY

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 465 days.

(21) Appl. No.: 15/892,222

(22) Filed: Feb. 8, 2018

(65) Prior Publication Data

US 2019/0239430 A1    Aug. 8, 2019

(51) Int. Cl.
| | |
|---|---|
| *A01D 34/82* | (2006.01) |
| *B60B 19/12* | (2006.01) |
| *A01D 34/00* | (2006.01) |
| *F16C 35/063* | (2006.01) |
| *A01D 34/81* | (2006.01) |

(52) U.S. Cl.
CPC ............ *A01D 34/82* (2013.01); *A01D 34/001* (2013.01); *A01D 34/81* (2013.01); *B60B 19/12* (2013.01); *F16C 35/063* (2013.01); *B60B 2320/10* (2013.01); *B60B 2380/14* (2013.01); *B60B 2900/212* (2013.01); *B60B 2900/321* (2013.01); *B60Y 2200/223* (2013.01)

(58) Field of Classification Search
CPC ...... A01D 34/81; A01D 34/001; A01D 34/82; B60B 19/12; B60B 2380/14; F16C 35/063; F16C 35/0635; F16C 2226/16; Y10T 403/7058
USPC ........ 384/396, 585, 586; 403/248, 258, 255, 403/263, 368, 369, 371
See application file for complete search history.

(56) References Cited

U.S. PATENT DOCUMENTS

| | | | | |
|---|---|---|---|---|
| 638,262 | A * | 12/1899 | McGuire | F16C 35/073 384/538 |
| 738,445 | A * | 9/1903 | Hoffmann | F16D 1/096 384/540 |
| 929,851 | A * | 8/1909 | Hess | F16C 35/073 384/538 |
| 1,206,505 | A * | 11/1916 | Blume | F16C 35/06 384/489 |
| 1,486,758 | A * | 3/1924 | Jerram | A01D 34/46 56/249.5 |
| 1,820,017 | A * | 8/1931 | Foulks | F16C 19/388 384/562 |
| 2,043,272 | A * | 6/1936 | Wallgren | F16C 17/02 384/272 |

(Continued)

*Primary Examiner* — Thomas B Will
*Assistant Examiner* — Joan D Misa
(74) *Attorney, Agent, or Firm* — Kirton McConkie; Brian Tucker

(57) ABSTRACT

A mower deck can include roller assemblies that prolong the life of bearings by more evenly distributing the roller's load to the bearings. The roller assembly can include a roller that is secured between opposing bearings via a tapered shaft of the roller and a correspondingly tapered collar that is housed within the corresponding bearing. The interface between the tapered shaft and the tapered collar causes the collar to be secured snugly within the bearing while also providing even distribution of the roller's load to the bearing.

17 Claims, 7 Drawing Sheets

(56) References Cited

U.S. PATENT DOCUMENTS

| | | | | |
|---|---|---|---|---|
| 2,397,703 A * | 4/1946 | Stallman | F16B 21/186 384/538 |
| 2,620,242 A * | 12/1952 | Beatty, Jr. | B65G 39/12 384/487 |
| 2,858,174 A * | 10/1958 | Mitchell | F16C 35/045 384/495 |
| 2,884,283 A * | 4/1959 | Korol | F16C 33/08 384/439 |
| 2,895,771 A * | 7/1959 | Ridgeway | F16C 19/46 384/585 |
| 2,970,018 A * | 1/1961 | Ruttgers | F16C 35/073 384/540 |
| 3,662,528 A * | 5/1972 | Akgulian | A01D 34/62 56/249 |
| 3,782,796 A * | 1/1974 | Rickley | B21B 31/074 384/584 |
| 3,841,771 A * | 10/1974 | Shankwitz | F16C 11/045 403/163 |
| 3,964,152 A * | 6/1976 | Shankwitz | E02F 9/006 29/426.5 |
| RE29,968 E * | 4/1979 | Geese | B21B 27/035 29/252 |
| 4,240,677 A * | 12/1980 | Payne | F16C 35/063 384/252 |
| 4,304,502 A * | 12/1981 | Stratienko | F16D 1/094 403/370 |
| 4,345,419 A * | 8/1982 | Chandler | A01D 34/62 56/249 |
| 4,351,143 A * | 9/1982 | Lessig, III | A01D 34/82 56/17.5 |
| 4,367,053 A * | 1/1983 | Stratienko | F16D 1/094 403/371 |
| 4,481,757 A * | 11/1984 | Tsuchiya | A01D 34/42 56/16.9 |
| 4,638,622 A * | 1/1987 | Smith | A01D 34/82 56/17.4 |
| 4,772,139 A * | 9/1988 | Bretton | F16C 27/04 384/535 |
| 5,421,442 A * | 6/1995 | Agnoff | B65G 39/12 193/35 R |
| 5,511,365 A * | 4/1996 | Rice | A01D 34/62 56/249 |
| 5,553,380 A * | 9/1996 | Rice | A01D 34/62 29/895.2 |
| 5,950,409 A * | 9/1999 | Davies | A01D 34/62 56/249 |
| 6,047,530 A * | 4/2000 | Bednar | A01D 75/30 56/13.6 |
| 6,056,473 A * | 5/2000 | Schafer | B21B 27/035 403/31 |
| 6,390,723 B1 * | 5/2002 | Schafer | B21B 27/035 403/15 |
| 6,470,663 B2 * | 10/2002 | Langworthy | A01D 34/71 56/320.2 |
| 6,484,481 B1 * | 11/2002 | Langworthy | A01D 75/30 56/6 |
| 7,237,374 B2 * | 7/2007 | Sugden | A01D 34/001 56/249 |
| 8,112,976 B1 * | 2/2012 | Kallevig | A01D 43/00 56/17.4 |
| 10,017,328 B1 * | 7/2018 | Wolf | B65G 39/09 |
| 10,392,197 B1 * | 8/2019 | Roozeboom | B65G 39/09 |
| 10,583,992 B2 * | 3/2020 | Clark | B65G 39/02 |
| 2002/0040570 A1 * | 4/2002 | Walker | A01D 75/30 56/11.9 |
| 2005/0257508 A1 * | 11/2005 | Modzik | A01D 75/30 56/7 |
| 2018/0291961 A1 * | 10/2018 | Newman | F16C 33/723 |

\* cited by examiner

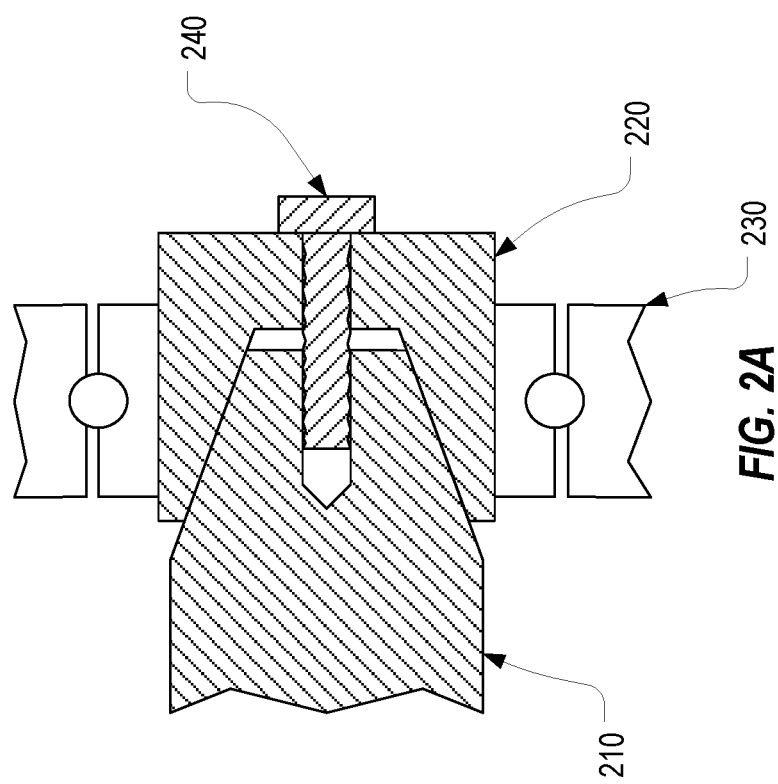

MOWER DECK ROLLER ASSEMBLY

CROSS-REFERENCE TO RELATED APPLICATIONS

N/A

BACKGROUND

Golf courses, sod farms, and other establishments with expansive grassy areas typically employ large commercial mowers to cut grass. A typical commercial mower may include multiple "mower decks" that house the cutting blades. Unlike a common residential mower, the mower deck of commercial mowers typically houses multiple (e.g., 2-4) cutting blades.

Mower decks oftentimes employ front and rear rollers to support the mower deck frame off the ground at a desired height. These rollers may be mounted to the frame via bearings of some type to allow the rollers to roll along the ground. Due to the torque that may be applied to a roller (e.g., due to uneven ground surfaces), the bearings may become damaged and require downtime and/or costly repairs.

BRIEF SUMMARY

The present invention extends to a mower deck roller assembly and to mower decks that include such roller assemblies. The roller assembly of the present invention includes a roller that is secured between opposing bearings via a tapered shaft of the roller and a correspondingly tapered collar that is housed within the corresponding bearing. The interface between the tapered shaft and the tapered collar causes the collar to be secured snugly within the bearing while also providing even distribution of the roller's load to the bearing.

In one embodiment, the present invention is implemented as a mower deck that includes: a main body that houses one or more cutting blades; a first roller assembly coupled to the main body; and a second roller assembly coupled to the main body opposite the first roller assembly. Each roller assembly comprises: a roller having shafts that extend from opposing ends, each shaft having a tapered outer surface; a pair of opposing bearings into which the shafts extend; a collar for each of the shafts, each collar having a concave inner end forming an opening to a tapered inner surface, the corresponding shaft being inserted into the inner end of corresponding collar such that the tapered outer surface of the shaft aligns with and contacts the tapered inner surface of the collar; and a coupling component for each of the shafts, each coupling component configured to force and secure the corresponding collar onto the corresponding shaft while the collar is positioned within the corresponding bearing to thereby cause an outer diameter of the collar to expand as the tapered inner surface of the collar slides along the tapered outer surface of the shaft, the expansion of the outer diameter of the collar causing the collar to be retained within the corresponding bearing.

In another embodiment, the present invention is implemented as a mower deck roller assembly that includes: a roller having a first shaft that extends from a first end of the roller and a second shaft that extends from the second end of the roller; opposing first and second bearings positioned outside the first and second ends of the roller; a first collar that is positioned overtop the first shaft and inside the first bearing, the first collar having a tapered inner surface that aligns with and contacts a tapered outer surface of the first shaft; a second collar that is positioned overtop the second shaft and inside the second bearing, the second collar having a tapered inner surface that aligns with and contacts a tapered outer surface of the second shaft; a first coupling component that forces and secures the first collar onto the first shaft to thereby cause an outer diameter of the first collar to expand until the first collar is secured within the first bearing; and a second coupling component that forces and secures the second collar onto the second shaft to thereby cause an outer diameter of the second collar to expand until the second collar is secured within the second bearing.

In another embodiment, the present invention is implemented as a mower deck that includes: a main body that houses one or more cutting blades; a first roller assembly coupled to the main body; and a second roller assembly coupled to the main body opposite the first roller assembly. Each roller assembly comprises: a roller having shafts that extend from opposing ends, each shaft having a tapered outer surface; a pair of opposing bearings into which the shafts extend; and a collar for each of the shafts, each collar having a tapered inner surface that aligns with and contacts the tapered outer surface of the corresponding shaft, each collar including one or more channels that extend from an inner end of the collar towards an outer end of the collar. Each collar is configured to be forced onto the corresponding shaft to thereby cause an outer diameter of the collar to expand as the tapered inner surface of the collar interfaces with the tapered outer surface of the shaft, the expansion of the outer diameter causing the collar to be secured within the corresponding bearing.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2A provides a detailed cross-sectional view;

DETAILED DESCRIPTION

Figure 1A:
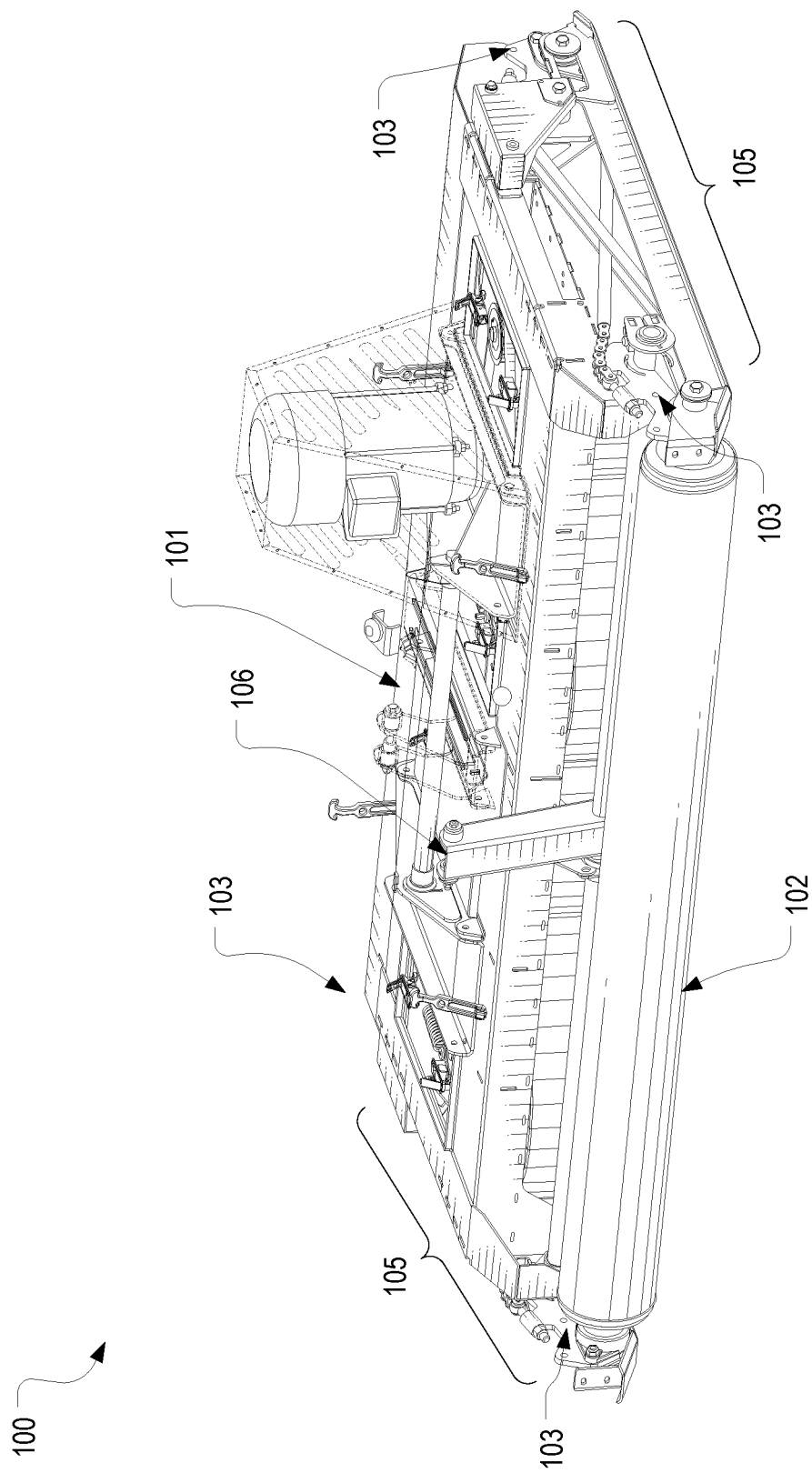
FIG. 1A illustrates a perspective view of a mower deck that includes roller assemblies that are configured in accordance with one or more embodiments of the present invention.
Figure 1B:
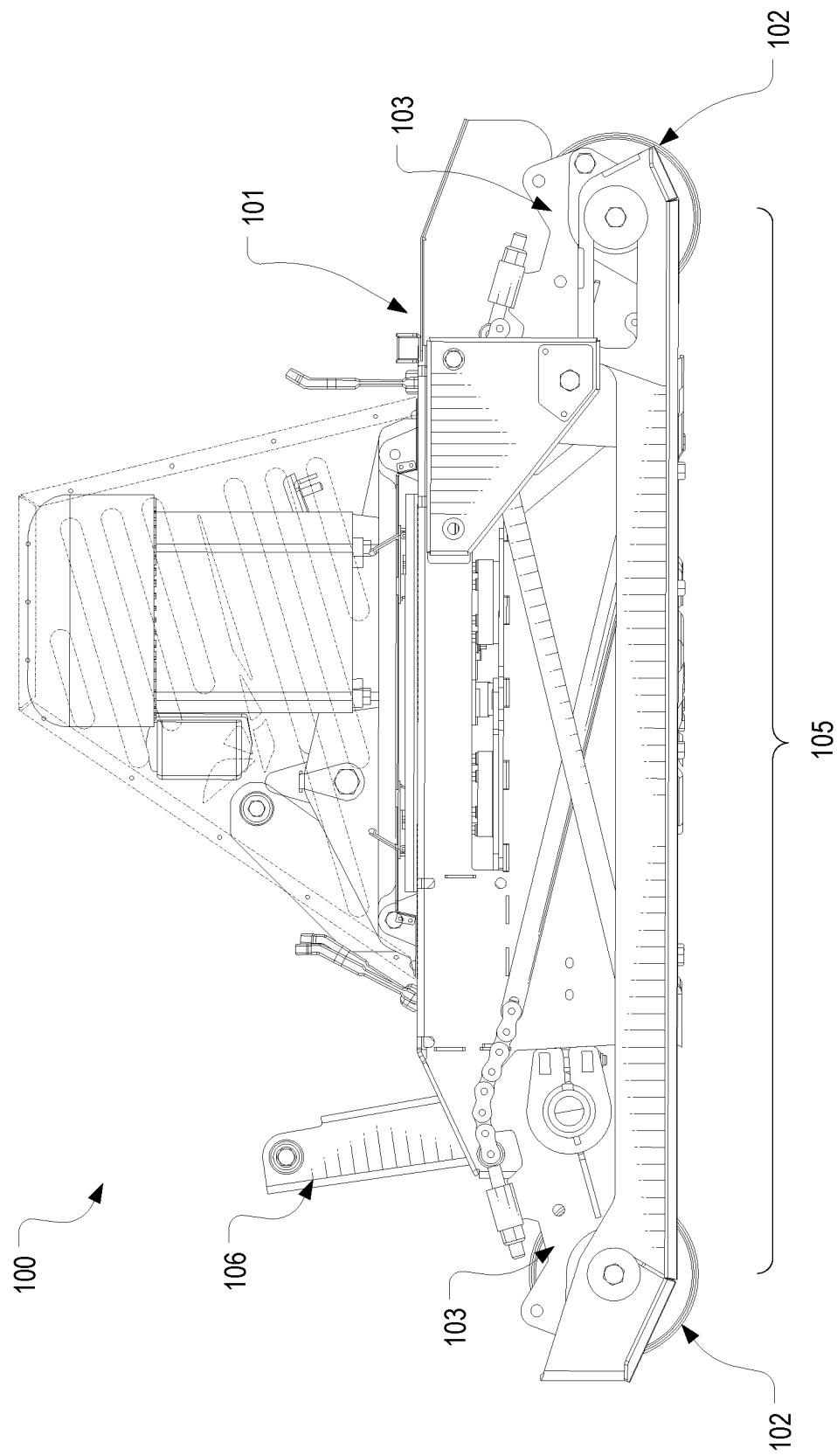
FIG. 1B illustrates a side view of the mower deck of FIG. 1A.

FIG. 1A provides a perspective view and FIG. 1B provides a side view of a mower deck 100 that is configured in accordance with one or more embodiments of the present invention. As shown, mower deck 100 includes a main body 101 which houses a number of cutting blades. Main body 101 is supported off the ground by rollers 102 which, in the depicted embodiment, extend along the front and rear sides of main body 101. The terms "front" and "rear" are relative terms used only to distinguish between two opposing sides of main body 101 and should not be construed as requiring the front side to be "in front" when the mower is travelling in a forward direction. At each corner of main body 101, a roller support arm 103 is coupled to the main body. Each of roller support arms 103 is configured to support an end of the corresponding roller 102.

The height of main body 101 relative to the ground is controlled by the position of rollers 102 relative to main body 101. As is described in U.S. patent application Ser. No. 15/795,065 titled Adjustable Mower Deck, which is incorporated herein by reference, a linkage consisting of coupling mechanism 105 can be employed on each side of main body 101 to couple the corresponding front and rear roller support arms 103. Coupling mechanism 105 is configured to cause each rear roller support arm 103 to be pivoted in unison with the front roller support arm 103 when arm 106 is actuated. Although the roller assembly of the present invention will be described as being used in conjunction with the linkage of the '065 Application, the roller assembly could equally be used on any other mower deck configuration that employs rollers.

Figure 2:
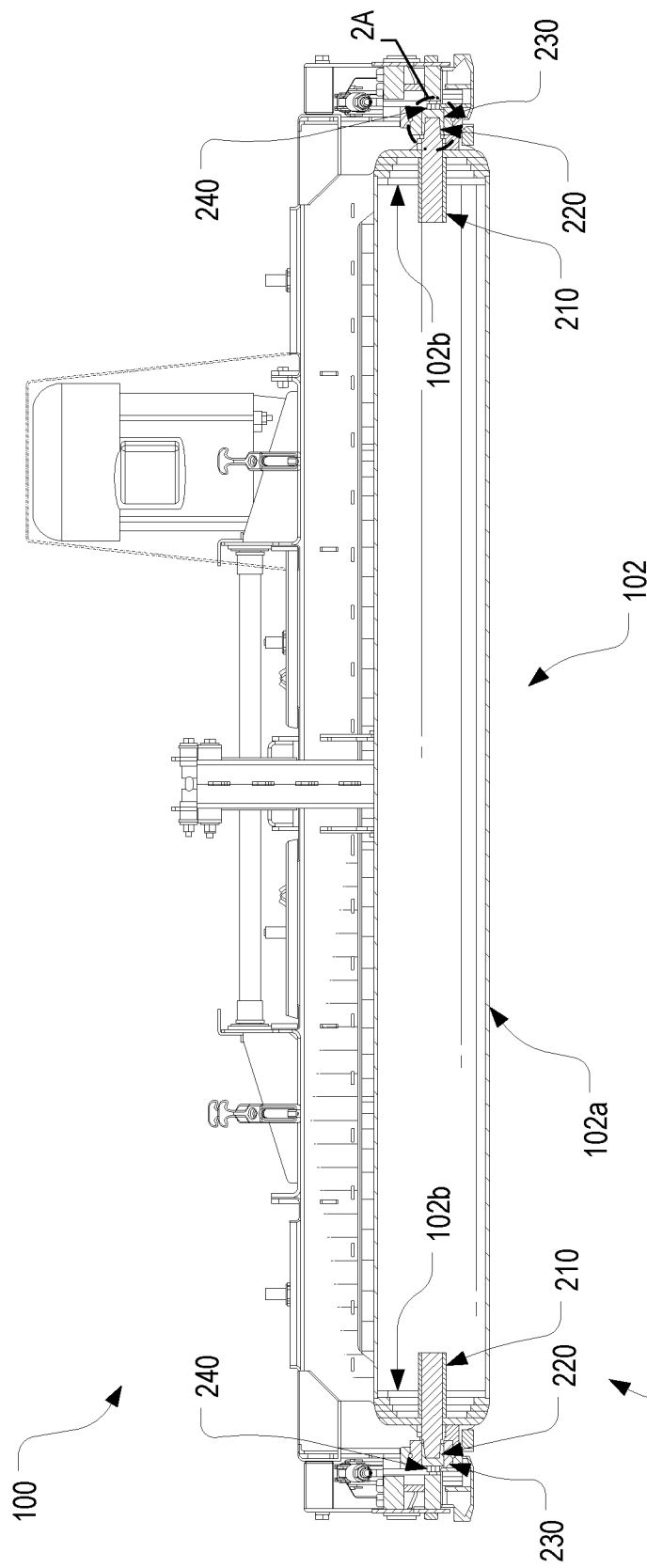
FIG. 2 illustrates a cross-sectional view of the mower deck of FIG. 1A.

FIGS. 2 and 2A provide cross-sectional views through the longitudinal axis of one of rollers 102 to illustrate how a roller assembly 200 is configured. Although not shown, the same roller assembly 200 can be employed with the other roller 102, and therefore, FIG. 2 and the following description is applicable to each roller assembly 200 of mower deck 100. In addition to roller 102, roller assembly 200 can include, at each end of roller 102, a shaft 210, a collar 220, a rolling bearing 230, and a coupling component 240 (e.g., a screw).

As shown in FIG. 2, roller 102 can be configured with a cylindrical portion 102a that extends at least partially along the front (or rear) side of main body 101 with shafts 210 that protrude from each end of cylindrical portion 102a. Each shaft 210 extends along the longitudinal axis of cylindrical portion 102a and is secured to cylindrical portion 102a such that cylindrical portion 102a will rotate as shafts 210 rotate. In some embodiments, including the depicted embodiment, shafts 210 can be secured within or integrally formed with an end cap 102b that is coupled to the end of cylindrical portion 102a, while in other embodiments, shafts 210 and cylindrical portion 102a can be integrally formed. It is noted that cylindrical portion 102a need not necessarily be perfectly cylindrical, but may have indented regions or other variations in the exterior surface.

Figure 3:
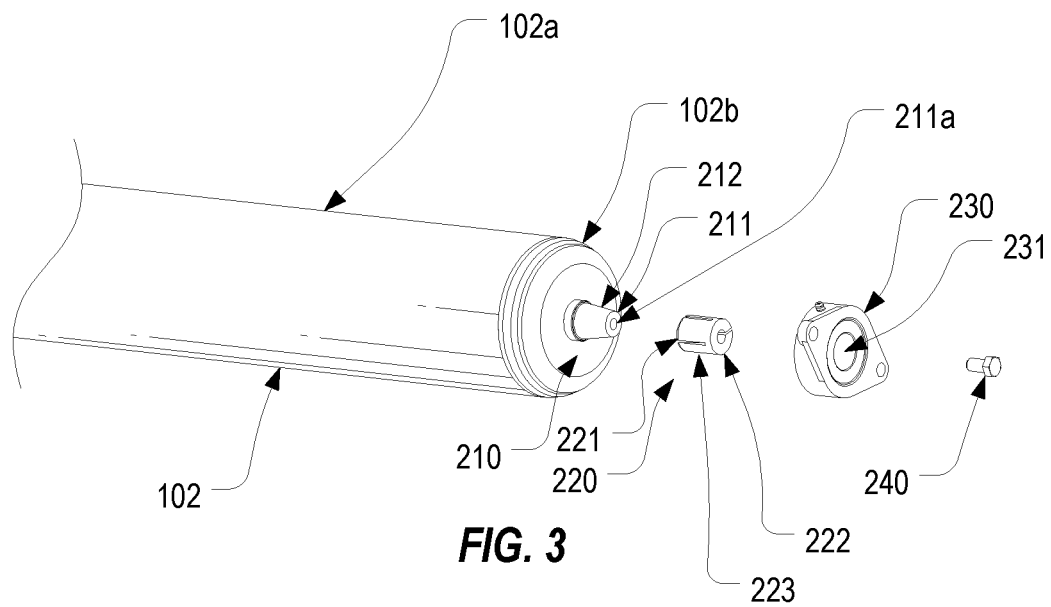
FIG. 3 illustrates an exploded view of a roller assembly that can be employed on the mower deck of FIG. 1A.
Figure 4:
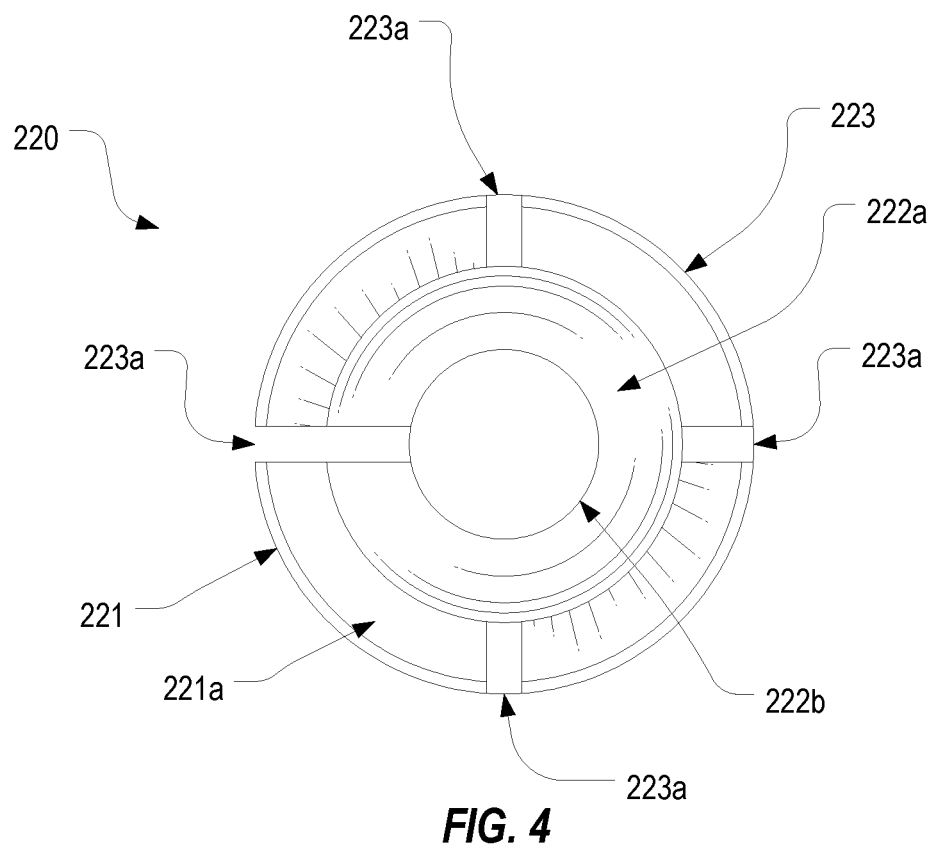
FIG. 4 illustrates an isolated view of a collar that can be employed in the roller assembly.
Figure 4A:
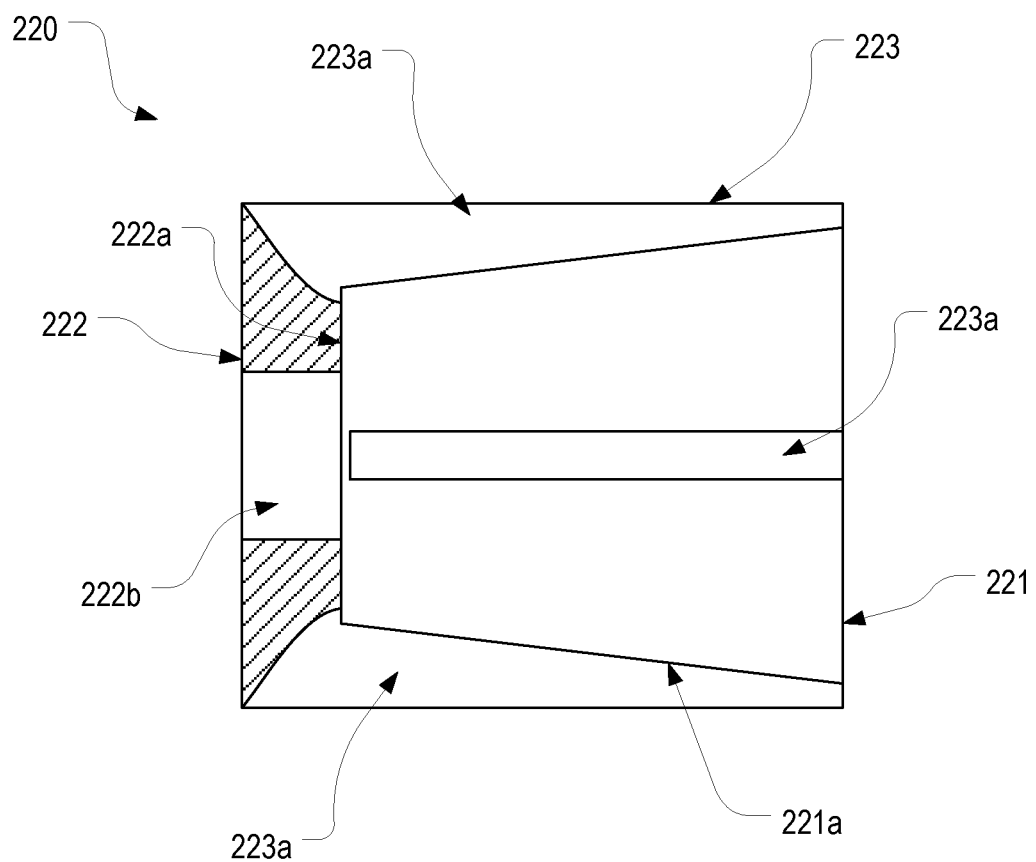
FIG. 4A illustrates a cross-sectional view of the collar.

As identified in FIG. 3, shaft 210 protrudes outwardly beyond end cap 102b to form an end surface 211 having an opening 211a formed therein. Opening 211a can be configured (e.g., threaded) to receive coupling component 240 as will be further described below. A tapered outer surface 212 is also formed at the end of shaft 210. As identified in FIGS. 3 and 4, collar 220 is configured with a cylindrical shape having an inner end 221, an outer end 222 and an outer surface 223 that extends between inner end 221 and outer end 222. Inner end 221 is concave and forms an opening to a tapered inner surface 221a that extends from inner end 221 to an end wall 222a positioned towards outer end 222. An opening 222b can be formed through end wall 222a. Also, a number of channels 223a can be formed through outer surface 223 and extend from inner end 221 towards outer end 222. For example, as seen in FIGS. 4 and 4A, collar 220 may include four channels 223a that are spaced equally around outer surface 223. In some embodiments, one of channels 223a can extend completely through outer end 222 such that the channel connects with opening 222b. As will be further described below, the role of channels 223a is to allow the outer diameter of collar 220 to be expanded.

The angles of tapered outer surface 212 and tapered inner surface 221a can substantially correspond to one another so that these two surfaces will align when collar 220 is placed overtop shaft 210. Likewise, opening 222b can be positioned to align with opening 211a so that coupling component 240 can be used to secure collar 220 to shaft 210. The diameter of outer surface 223 can be slightly less than the diameter of opening 231 of rolling bearing 230 (e.g., less than the inner diameter of the inner ring or race of bearing 230) such that collar 220 can be inserted into opening 231 while collar 220 is placed around shaft 210.

Returning to FIG. 2, with collars 220 positioned overtop shafts 210, the collars can be inserted into openings 231 of rolling bearings 230. At this point, because the diameter of outer surface 223 is slightly less than the diameter of opening 231, roller 102 will remain free to slide in a side-to-side direction relative to main body 101 which can facilitate the process of mounting roller 102 to main body 101.

Figure 5:
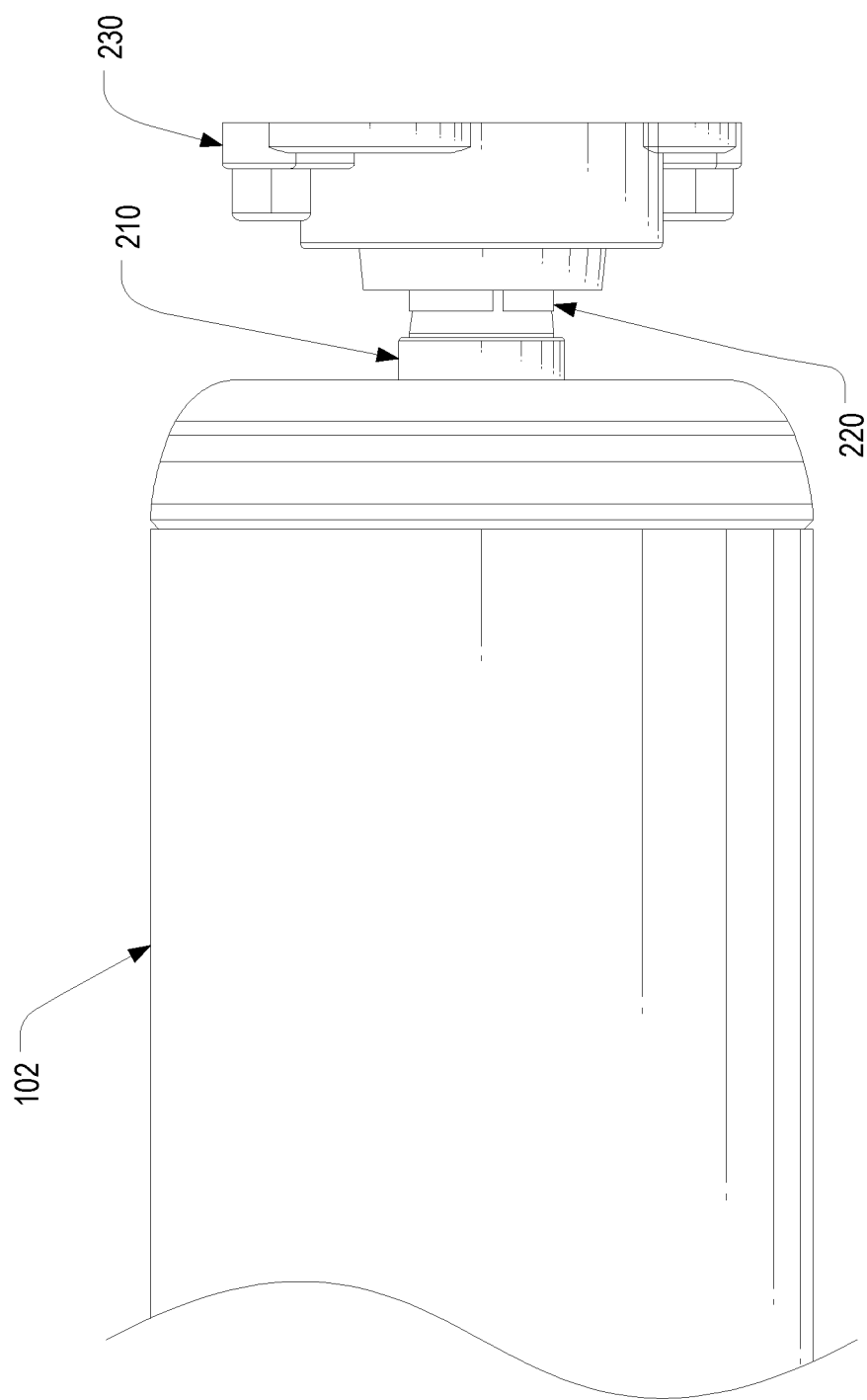
FIG. 5 illustrates an isolated view of the roller assembly.

To secure roller 102 within the opposing rolling bearings 230, coupling component 240 can be tightened into opening 211a of the corresponding shaft 210 while collar 220 is positioned overtop shaft 210 and within opening 231 of rolling bearing 230. As mentioned above, prior to tightening coupling component 240, tapered outer surface 212 and tapered inner surface 221a will substantially align (i.e., the surfaces will be in contact with one another). Then, as screw 240 is tightened, collar 220 will be forced inwardly towards and onto shaft 210. Due to the tapering of surfaces 212 and 221a, the inward movement of collar 220 relative to shaft 210 will cause the outer diameter of collar 220 to expand. Due to channels 223a, outer surface 223 will expand uniformly against the inner ring of bearing 230 to form a friction fit between collar 220 and the inner ring. A friction fit will also be formed between tapered outer surface 212 and tapered inner surface 221a. In this way, roller 102 will be mounted snugly within the opposing rolling bearings 230 as is represented in FIG. 5. Importantly, the uniform expansion of outer surface 223 will minimize or eliminate any imbalances in the force that is transferred from roller 102 to rolling bearings 230 during operation of mower deck 100 thereby extending the life of roller assembly 200.

In some embodiments, more than one coupling component 240 can be employed to force collar 220 onto shaft 210. In such cases, shaft 210 and collar 220 may have more than one corresponding opening. Also, in some embodiments, coupling component 240 can be in the form of a threaded stud that is integrated into or otherwise secured to shaft 210 and extends out through opening 222b and a nut that threads onto the threaded stub.

In some embodiments, the depth of tapered inner surface 221a (i.e., the distance between inner end 221 and end wall 222a) relative to the angles of surfaces 212 and 221a can be configured to prevent the over-expansion of outer surface 223. In particular, the expansion of outer surface 223 will be proportional to the distance that coupling component 240 is tightened into opening 211a. This distance will be limited by the relative position of end wall 222a. In other words, collar 220 can only be forced onto shaft 210 until end wall 222a contacts end surface 211 of shaft 210. End wall 222a and surfaces 212 and 221a can be configured so that the diameter of outer surface 223 when end wall 222a is in contact with end surface 211 is still less than the diameter that would cause the inner ring of bearing 230 to be forced into the outer ring to the point where rotation of bearing 230 is limited. In other words, collar 220 can be designed to prevent coupling component 240 from being tightened to the point that bearing 230's rotation is hindered.

In summary, the present invention provides a roller assembly that can maximize the life the bearings and other supporting structures of a mower deck roller. The use of a collar in the roller assembly allows the shaft of the roller to be secured within the bearing with a friction fit as opposed to with set screw or other non-uniform mechanism such that the roller's load is more evenly distributed to the bearings.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower deck comprising:
   a main body that houses one or more cutting blades;
   a first roller assembly coupled to the main body; and
   a second roller assembly coupled to the main body opposite the first roller assembly;
   wherein each roller assembly comprises:
      a roller having shafts that extend from opposing ends, each shaft having a tapered outer surface;
      a pair of opposing bearings into which the shafts extend;
      a collar for each of the shafts, each collar having a concave inner end forming an opening to a tapered inner surface, the corresponding shaft being inserted into the inner end of the corresponding collar such that the tapered outer surface of the shaft aligns with and contacts the tapered inner surface of the collar, each collar including one or more channels that are formed through an outer surface of the collar and extend from the inner end of the collar towards an outer end of the collar; and
      a coupling component for each of the shafts, each coupling component configured to force the corresponding collar onto the corresponding shaft while the collar is positioned within the corresponding bearing to thereby create a first friction fit between the collar and the shaft that causes the collar and the shaft to rotate together, wherein, as each coupling component forces the corresponding collar onto the corresponding shaft, the one or more channels in the collar expand to thereby cause an outer diameter of the collar to expand as the tapered inner surface of the collar slides along the tapered outer surface of the shaft, the expansion of the outer diameter of the collar creating a second friction fit between the collar and the corresponding bearing, the second friction fit retaining the collar and the corresponding shaft within the bearing while evenly distributing load from the corresponding roller to the bearing.

2. The mower deck of claim 1, wherein each roller comprises a cylindrical portion and opposing end caps, each shaft extending from the corresponding end cap.

3. The mower deck of claim 2, wherein each of the shafts is coupled to or integrally formed with the corresponding end cap.

4. The mower deck of claim 1, wherein the bearings are rolling element bearings.

5. The mower deck of claim 1, wherein each coupling component threads into an opening formed in an end surface of the corresponding shaft.

6. The mower deck of claim 1, wherein, prior to being forced onto the shaft, the outer diameter of each collar is less than an inner diameter of an inner ring of the bearing within which the respective collar is positioned.

7. The mower deck of claim 1, wherein the one or more channels comprise four channels that are equally spaced around the collar.

8. The mower deck of claim 1, wherein each collar includes at least three channels.

9. The mower deck of claim 1, wherein each collar includes an opening in an outer end, at least one of the one or more channels extending from the inner end of the collar to the opening in the outer end of the collar.

10. The mower deck of claim 9, wherein each collar includes three channels that do not extend through the outer end of the collar and one channel that extends to the opening in the outer end of the collar.

11. The mower deck of claim 10, wherein the channels are spaced equally around the collar.

12. The mower deck of claim 1, wherein the tapered inner surface extends up to an end wall, and wherein the collar is configured such that the outer diameter of the collar expands to a maximum diameter when the end wall contacts an end surface of the shaft.

13. A mower deck roller assembly comprising:
   a roller having a first shaft that extends from a first end of the roller and a second shaft that extends from the second end of the roller;
   opposing first and second bearings positioned outside the first and second ends of the roller;
   a first collar that is positioned overtop the first shaft and inside the first bearing, the first collar having a tapered inner surface that aligns with and contacts a tapered outer surface of the first shaft, the first collar including one or more channels that are formed through an outer surface of the first collar and extend from an inner end of the first collar towards an outer end of the first collar;
   a second collar that is positioned overtop the second shaft and inside the second bearing, the second collar having a tapered inner surface that aligns with and contacts a tapered outer surface of the second shaft, the second collar including one or more channels that are formed through an outer surface of the second collar and extend from an inner end of the second collar towards an outer end of the second collar;
   a first coupling component that forces the first collar onto the first shaft while the first collar is positioned inside the first bearing to thereby create a first friction fit between the first collar and the first shaft that cases the first collar and the first shaft to rotate together, wherein, as the first coupling component forces the first collar onto the first shaft, the one or more channels in the first collar expand to thereby cause an outer diameter of the first collar to expand until the first collar forms a second friction fit with the first bearing, the second friction fit retaining the first collar and the first shaft inside the first bearing while evenly distributing load from the roller to the first bearing; and a second coupling component that forces the second collar onto the second shaft while the second collar is positioned inside the second bearing to thereby create a first friction fit between the second collar and the second shaft that causes the second collar and the second shaft to rotate together, wherein, as the second coupling component forces the second collar onto the second shaft, the one or more channels in the second collar expand to thereby cause an outer diameter of the second collar to expand until the second collar forms a second friction fit with the second bearing, the second friction fit retaining the second collar and the second shaft inside the second bearing while evenly distributing load from the roller to the second bearing.

14. The mower deck roller assembly of claim 13, wherein the one or more channels in each of the first and second collars comprise four channels that are equally spaced around the respective collar.

15. The mower deck roller assembly of claim 13, wherein at least one of the one or more channels in each of the first and second collars extends through the outer end of the respective collar.

16. The mower deck roller assembly of claim 13, wherein the one or more channels in each of the first and second collars comprise two or more channels, one of which extends through the outer end of the respective collar and intersects with an opening in the outer end of the respective collar.

17. The mower deck roller assembly of claim 16, wherein the two or more channels comprise four channels that are equally spaced around the collar.

* * * * *